Aug. 22, 1933. T. W. B. WATLING 1,923,287
COIN CONTROLLED AMUSEMENT APPARATUS
Filed Feb. 15, 1932  2 Sheets-Sheet 2
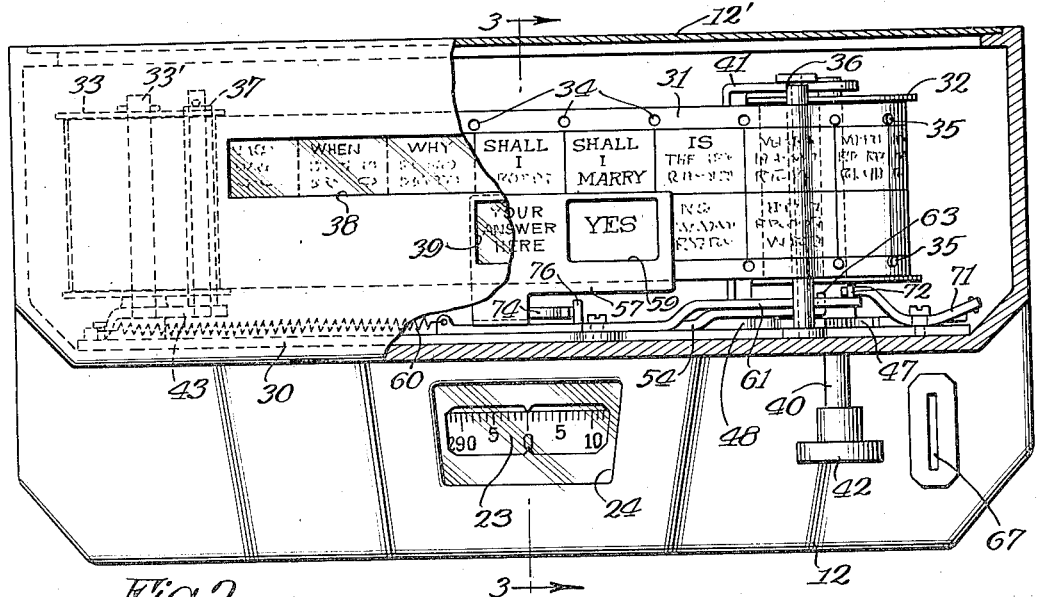
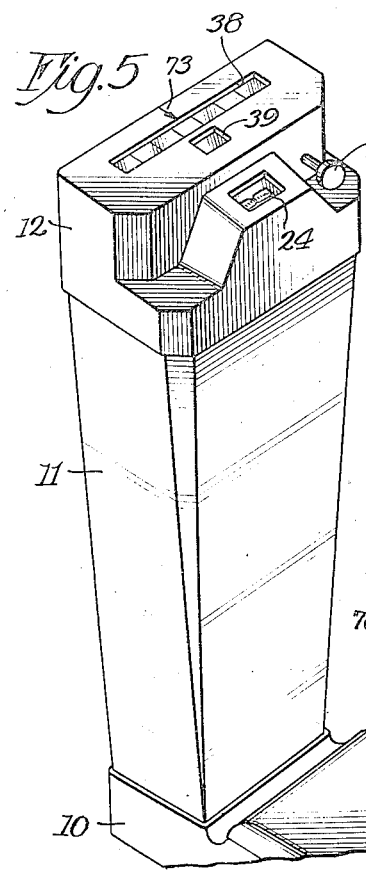
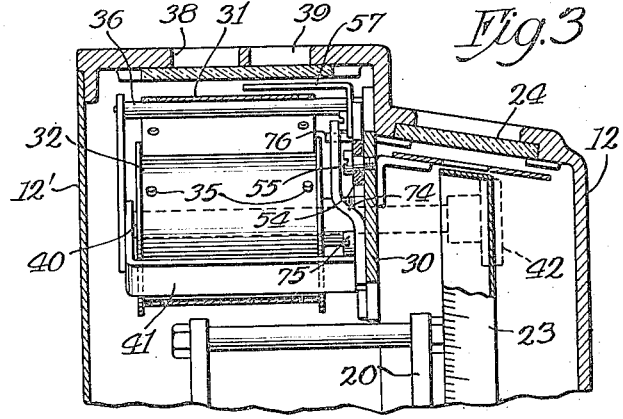
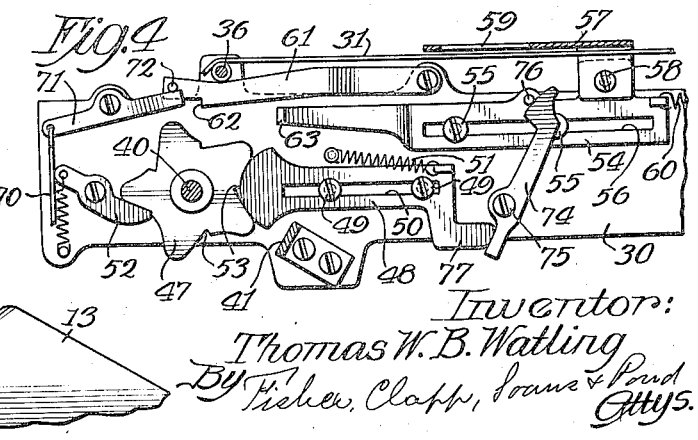
Inventor:
Thomas W. B. Watling
By Fisher, Clapp, Soans & Pond
Attys.

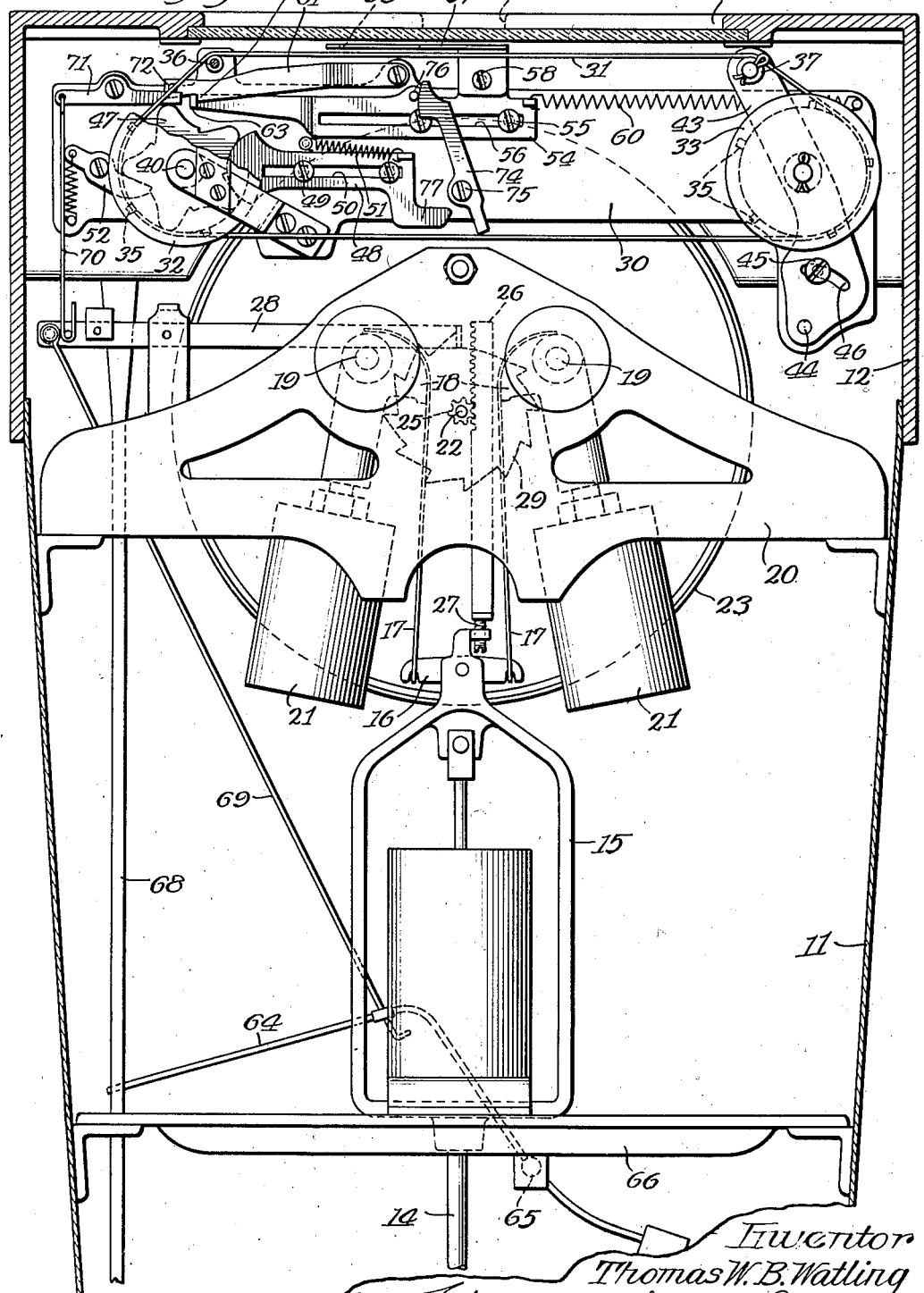

Patented Aug. 22, 1933

1,923,287

UNITED STATES PATENT OFFICE 1,923,287

COIN CONTROLLED AMUSEMENT APPARATUS

Thomas W. B. Watling, Chicago, Ill.

Application February 15, 1932. Serial No. 593,038

6 Claims. (Cl. 40—28)

The invention relates to amusement or fortune-telling apparatus and seeks to provide improved means for selecting a question together with coin-controlled devices for exposing or indicating an answer.

The invention consists in the features of improvement hereinafter set forth, illustrated in the preferred form in the accompanying drawings and more particularly pointed out in the appended claims.

The apparatus is preferably associated with a weighing scale, both being controlled by a common coin actuated means.

In the drawings:

Fig. 1 is a view in rear elevation of a weighing scale with the present improvement applied thereto and with the enclosing casing shown in section.

Fig. 2 is a plan view with a portion of the casing broken away.

Fig. 3 is a section on line 3—3 of Fig. 2.

Fig. 4 is a view of some of the parts shown in Fig. 1, but with certain of the parts in shifted position.

Fig. 5 is a perspective view of the apparatus.

The frame or casing comprises a base 10, an upright portion 11 and an upper portion or cap 12. The scale platform 13 is connected as usual to a weight-operated rod 14 having a yoke 15 at its upper end. A cross-piece 16 pivoted to the yoke engages the lower ends of a pair of straps 17 which extend over and are secured to cam-shaped sectors 18 that are fixed to a pair of shafts 19. The latter are journaled in a suitable cross-frame 20 and carry pendulum weights 21 which swing outwardly to counterbalance a weight placed upon the scale platform.

A shaft 22 journaled in the frame 20 carries an indicating disk 23 having a scale on its flanged edge which is exposed to view through a glazed opening 24 in the upper front part of the top or cap 12. A pinion 25 on the shaft 22 engages a rack 26 and the lower end of the latter engages an adjustable stop screw 27 mounted on the yoke 15. A pivoted latch 28 engages a toothed disk 29 on the shaft 22 and normally holds the indicating disk against movement. When a weight is placed on the platform and the latch 28 released, rack 26 descends until it engages the stop 27 and thereby rotates the disk 23. The teeth on the disk 29 are so shaped that the latch 28 does not interfere with the return movement of the parts when the weight is removed from the scale platform.

The amusement or fortune-telling apparatus is mounted in the upper rear part of the cap or top portion 12 and its parts are fixed to and project rearwardly from a supporting plate 30. An endless flexible band 31 extends over a pair of drums 32 and 33 and preferably the band is provided with spaced perforations 34 in its opposite edges which are engaged by short pins 35 on the drums. The upper reach of the band extends over a pair of guide rollers 36 and 37 so that it passes below and adjacent two glazed sight openings 38 and 39 in the top of the cap 12. The band carries a rear row or series of questions which are exposed through the elongated opening 38 and it also carries a front row or series of answers which, as the band is moved, are aligned one at a time with the small view opening 39.

The drum 32 is fixed to a shaft 40 which is journaled in the supporting plate 30 and at its rear end in a bracket 41 which is fixed to and projects rearwardly from the plate 30. The shaft also projects through an opening in the cap 12 of the casing and is provided with a knob 42 by which it and the drum 32 can be rotated to move the band 31.

The guide pin or roller 36 adjacent the drum 32 is mounted on and projects rearwardly from the supporting plate 30. The other guide pin or roller 37 and the supporting shaft 33' of the drum 33 are preferably mounted on a bracket or arm 43 which is connected to the supporting plate 30 by a pivot pin 44 and a set screw 45. The latter extends through an arc-shaped slot 46 which is concentric with the pivot pin so that the arm 43 and the drum and guide roller thereon can be adjusted to take up any slack in the flexible band 31. Also, by detaching a removable back plate 12', loosening the set screw 45 and moving the arm 43 inwardly, the band can be readily removed rearwardly from the drums and another band substituted.

A toothed or star-shaped cam 47 is fixed on the shaft 40 of the drum 32, this cam being arranged against the inner face of the supporting plate 30. A member or dog 48 is mounted on the plate by means of a pair of guiding pins 49 which extend through a slot 50 therein. A spring 51 connected to the dog presses its outer arcuate end portion against the toothed cam 47 and thereby yieldingly holds the drum 32 and the flexible band in adjusted position. Preferably also, a spring-held dog 52 pivoted on the plate 30 is arranged to engage notches 53 in the cam 47 so that the drum 42 and flexible band can only be moved in one direction.

A slide 54 is mounted on the plate 30 by means of guide pins 55 extending through a slot 56 therein, and a shutter 57 is adjustably fixed to the slide by means of a set screw 58. The shutter 57 extends over the forward portion of the flexible band 31 and below the sight opening 39. In the normal position of the shutter, the band is not visible through the opening 39 but, in its shifted position, an opening 59 in the shutter is aligned with the opening 39 to expose one of the answers on the flexible band.

A spring 60 connected to the slide 54 is arranged to move the slide and shutter to expose an answer on the band. The slide and shutter are held in normal position with the spring 60 under tension, by a latch 61 pivoted on the upper portion of the plate 30 and having a shoulder 62 which is arranged to engage an inwardly offset lug 63 on the outer end of the slide 54.

Means for tripping the latch 61 and the latch 28 for the weight indicator comprises a counterbalanced arm 64 (see Fig. 1) pivoted at 65 to a cross bar 66 and having one end arranged to be engaged by a coin inserted in the slot 67 and descending through a chute 68. The arm 67 is connected by a rod 69 to the outer end of the latch 28 and a link or rod 70 connects the latter to a pivoted trip 71 which is arranged to engage a pin 72 on the latch 61 and thereby release it. Preferably, the rod 70 has a one-way connection with the latch 28 and the rod or link 69 has a one-way connection with the counterbalanced arm 64.

Any one using the apparatus can stand on the scale platform and readily, by means of the knob 42, move the flexible band 31 to select any one of the questions on the band by bringing it opposite an indicating mark or arrow 73 on the top of the casing at one side of the sight opening 38. By so doing an appropriate answer is brought below the opening 39. The star cam 47 and spring-actuated plunger 48 insure the accurate register of the answer with the opening. Then when a coin is inserted, the latches 61 and 28 are released and the disk 23 and shutter 57 are moved to indicate the user's weight and expose the answer.

As soon as the coin passes the outer end of the arm 64, the counterbalance thereon will restore the tripping devices to normal position, and when the user steps from the scale platform, the counterweights 21 will return the weighing apparatus and indicator disk 23 to normal position. But the shutter 57 will remain in shifted position. Means are however, provided for restoring the shutter when the flexible band is again operated. For this purpose, an arm 74 is pivoted on the plate 30 at 75 and its upper cam-shaped end is arranged to engage a pin 76 on the slide 54. When the slide is moved to shifted position as shown in Fig. 4, the lower end of the arm 74 is swung against an extension or lug 77 on the inner end of the dog or sliding member 48. Then, when the band is again adjusted to select a question, the rotation of the cam 47 will move the sliding dog 48 and thereby, through the medium of the arm 74, shift the slide 54 and shutter 57 back to normal position and into reengagement with the latch 61. At the same time, the spring 60 is tensioned to again operate the shutter when the latch 61 is released upon the insertion of a coin.

Changes may be made in the details set forth without departure from the scope of the appended claims.

I claim as my invention:

1. In an apparatus of the class described, the combination with a casing, of an endless band in the casing bearing a series of questions and answers, rotatable drums whereon the band is mounted, a shutter movable to expose an answer, and a cam connected to one of said drums for restoring the shutter.

2. In an apparatus of the class described, the combination with a casing, of an endless band in the casing bearing a series of questions and answers, rotatable drums whereon the band is mounted, a part connected to one of the drums and operable from the exterior of the casing to adjust the band and select a question, a toothed cam on one of said drums, a part cooperating with and actuated by said cam for holding the band in adjusted position, and a shutter moved to closed position by said cam-actuated part and shiftable to open position to expose an answer.

3. In an apparatus of the class described, the combination with a casing, of an endless band in the casing bearing a series of questions and answers, rotatable drums whereon the band is mounted, a part connected to one of the drums and operable from the exterior of the casing to adjust the band and select a question, a toothed cam on one of said drums, a spring-held member cooperating with and actuated by the cam for holding the band in adjusted position, a shutter for exposing an answer, and means operated by said cam-actuated member for restoring the shutter.

4. In an apparatus of the class described, the combination with a casing, of an endless band in the casing bearing a series of questions and answers, rotatable drums whereon the band is mounted, a part connected to one of the drums and operable from the exterior of the casing to adjust the band and select a question, a toothed cam on the last-mentioned drum, a spring-held dog cooperating with said cam for holding the band in adjusted position, a support for the other of said drums, means for adjusting said support to tighten and release the band and a shutter movable to expose an answer and arranged to be restored to normal position by said cam.

5. In an apparatus of the class described, the combination with a casing, of an endless band in the casing bearing a series of questions and answers, rotatable drums whereon the band is mounted, a part connected to one of the drums and operable from the exterior of the casing to adjust the band and select a question, a shutter extending over the band, a spring for moving the shutter to expose an answer, a releaseable latch for holding the shutter in closed position, and a cam connected to one of said drums for returning the shutter into engagement with said latch and for storing power in said spring.

6. In an apparatus of the class described, the combination with a casing, of an endless band in the casing bearing a series of questions and answers, a supporting plate, rotatable drums carried by and disposed on one side of said plate and whereon the band is mounted, a part connected to one of the drums and operable from the exterior of the casing to adjust the band and select a question, a support for the other of said drums adjustably mounted on said plate to tighten or release the band and permit its application and removal over the ends of the drums, and a shutter extending over the band and movably mounted on the supporting plate and adapted to expose an answer in its open position.

THOMAS W. B. WATLING.